US009302750B2

(12) United States Patent
Moran

(10) Patent No.: US 9,302,750 B2
(45) Date of Patent: Apr. 5, 2016

(54) SELF-LEVELING BOAT BUMPER SYSTEM

(71) Applicant: Michael Patrick Moran, Fort Myers Beach, FL (US)

(72) Inventor: Michael Patrick Moran, Fort Myers Beach, FL (US)

(*) Notice: Subject to any disclaimer, the term of this patent is extended or adjusted under 35 U.S.C. 154(b) by 78 days.

(21) Appl. No.: 14/269,479

(22) Filed: May 5, 2014

(65) Prior Publication Data

US 2015/0314841 A1 Nov. 5, 2015

Related U.S. Application Data

(60) Provisional application No. 61/950,477, filed on Mar. 10, 2014.

(51) Int. Cl.
*E02B 3/26* (2006.01)
*B63B 59/02* (2006.01)
*E06C 1/04* (2006.01)

(52) U.S. Cl.
CPC . *B63B 59/02* (2013.01); *E02B 3/26* (2013.01); *E06C 1/04* (2013.01)

(58) Field of Classification Search
CPC .......................................................... E02B 3/026
See application file for complete search history.

(56) References Cited

U.S. PATENT DOCUMENTS

| | | | | |
|---|---|---|---|---|
| 2,844,943 A * | 7/1958 | Kennedy | ................... | E02B 3/26 114/220 |
| 3,486,342 A * | 12/1969 | Aks | ............................... | 405/212 |
| 3,975,916 A | 8/1976 | Watson | | |
| 4,124,986 A | 11/1978 | Postma | | |
| 4,227,832 A * | 10/1980 | Leone | ...................... | E02B 3/26 114/219 |
| 4,357,891 A * | 11/1982 | Sluys | ...................... | 114/230.27 |
| 4,584,958 A | 4/1986 | Green | | |
| D297,627 S | 9/1988 | Patton | | |
| 4,843,994 A * | 7/1989 | Wilson et al. | .................. | 114/219 |
| 4,900,192 A | 2/1990 | Wood | | |
| 5,007,363 A * | 4/1991 | James | .......................... | 114/219 |
| 5,014,638 A * | 5/1991 | Ilves | ....................... | B63B 21/00 114/230.18 |
| 5,018,471 A | 5/1991 | Stevens | | |
| 5,037,242 A * | 8/1991 | Nill | ............................... | 405/215 |
| 5,487,349 A * | 1/1996 | Andreassen | .................. | 114/219 |
| 5,493,991 A * | 2/1996 | Wright et al. | ............. | 114/230.27 |
| 5,497,723 A | 3/1996 | Chase | | |
| 5,590,616 A * | 1/1997 | Vera | .......................... | 114/61.16 |
| 5,603,280 A * | 2/1997 | Shackelford, Jr. | ....... | 114/230.27 |
| D378,508 S | 3/1997 | Kinkead | | |

(Continued)

FOREIGN PATENT DOCUMENTS

WO WO 9307050 A1 * 4/1993 ............. B63B 59/02

OTHER PUBLICATIONS

Unknown Author, Boat Fenders—How-To Guides, Feb. 16, 2014 or earlier, http://www.savvyboater.com/boat-fenders-resources.aspx.

(Continued)

*Primary Examiner* — Tara M. Pinnock
(74) *Attorney, Agent, or Firm* — George F. Wallace

(57) ABSTRACT

A self-leveling boat bumper system attached to a nautical structure can include a floating bumper arrangement having a float element, a float extension, and a boat bumper; and a receiver, fixed to the nautical structure and moveably engaged with the arrangement, or fixed to the arrangement and moveably engaged with a guide fixed to the nautical structure. When floating within a body of water, the float element can provide a buoyancy force that maintains the boat bumper in a static position between, and including, first and second positions, and as the level of the water changes.

18 Claims, 7 Drawing Sheets

(56) References Cited

U.S. PATENT DOCUMENTS

| | | | | |
|---|---|---|---|---|
| 5,697,316 | A | 12/1997 | Kinkead | |
| 5,701,837 | A | 12/1997 | Harvey | |
| 5,727,493 | A | 3/1998 | Pierce | |
| 5,762,016 | A | 6/1998 | Parsons | |
| 5,937,781 | A * | 8/1999 | Isella et al. | 114/230.26 |
| D439,038 | S | 3/2001 | Hinkle | |
| 6,327,989 | B1 | 12/2001 | Beach | |
| 6,349,661 | B1 | 2/2002 | Dusek | |
| D456,323 | S | 4/2002 | Dietz | |
| 6,435,122 | B1 * | 8/2002 | Skulnick | 114/219 |
| 6,746,181 | B1 * | 6/2004 | Heintz | E02B 3/068 114/263 |
| 6,783,303 | B2 | 8/2004 | Snyder | |
| 7,153,063 | B2 * | 12/2006 | Griffen | 405/215 |
| 7,237,502 | B1 | 7/2007 | Atkinson | |
| 7,322,307 | B1 * | 1/2008 | Perry | 114/219 |
| D578,464 | S | 10/2008 | Sheedy et al. | |
| 7,617,792 | B1 * | 11/2009 | Pursley | 114/219 |
| 7,717,642 | B2 | 5/2010 | Patten | |
| 8,025,019 | B1 * | 9/2011 | Katulka | 114/220 |
| D657,300 | S | 4/2012 | Wright | |
| 8,156,883 | B2 | 4/2012 | Sheedy et al. | |
| 2006/0130727 | A1 | 6/2006 | Eischeid | |
| 2006/0144310 | A1 * | 7/2006 | Lemonides | 114/230.26 |
| 2007/0094816 | A1 | 5/2007 | Patten | |
| 2007/0113773 | A1 * | 5/2007 | Nakano | 114/362 |
| 2009/0107384 | A1 * | 4/2009 | Stephenson, Jr. | 114/219 |
| 2010/0107953 | A1 | 5/2010 | Selway | |
| 2011/0299927 | A1 * | 12/2011 | McCormick et al. | 405/27 |

OTHER PUBLICATIONS

Unknown Author, Anchor Stern or Bow Fender, Jun. 19, 2014 or earlier, http://www.sheridanmarine.com/.

* cited by examiner

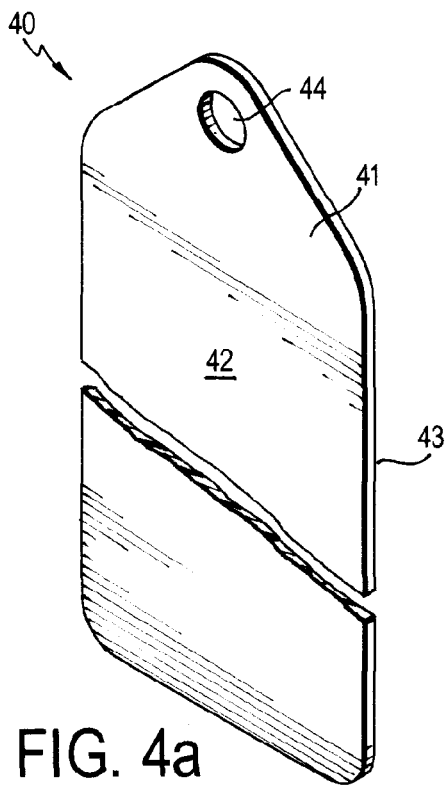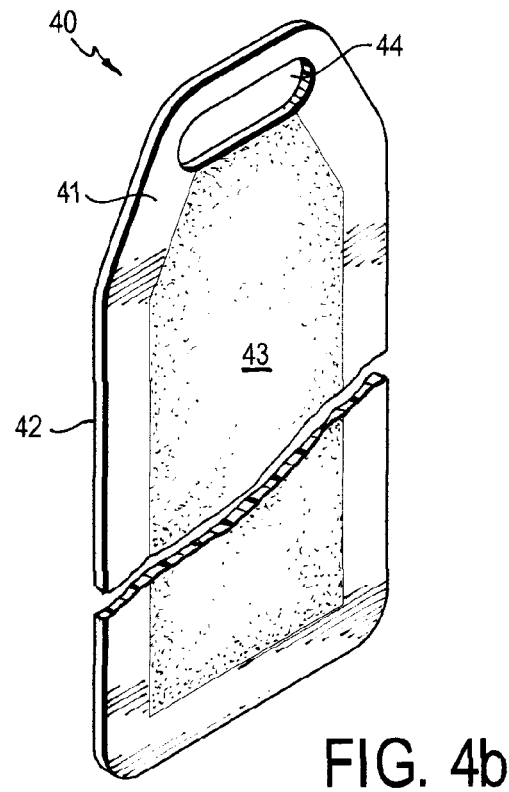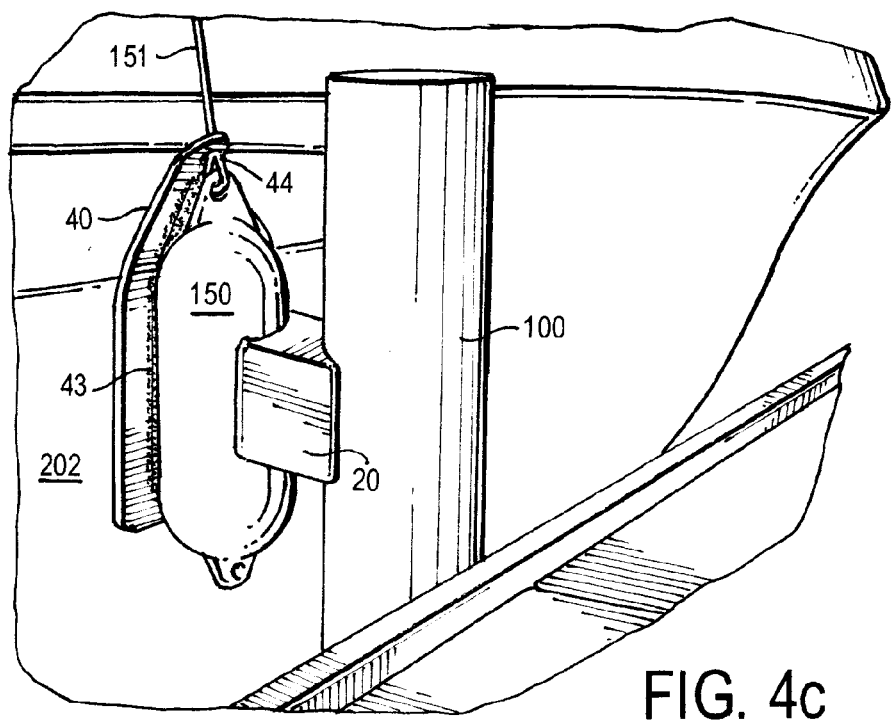

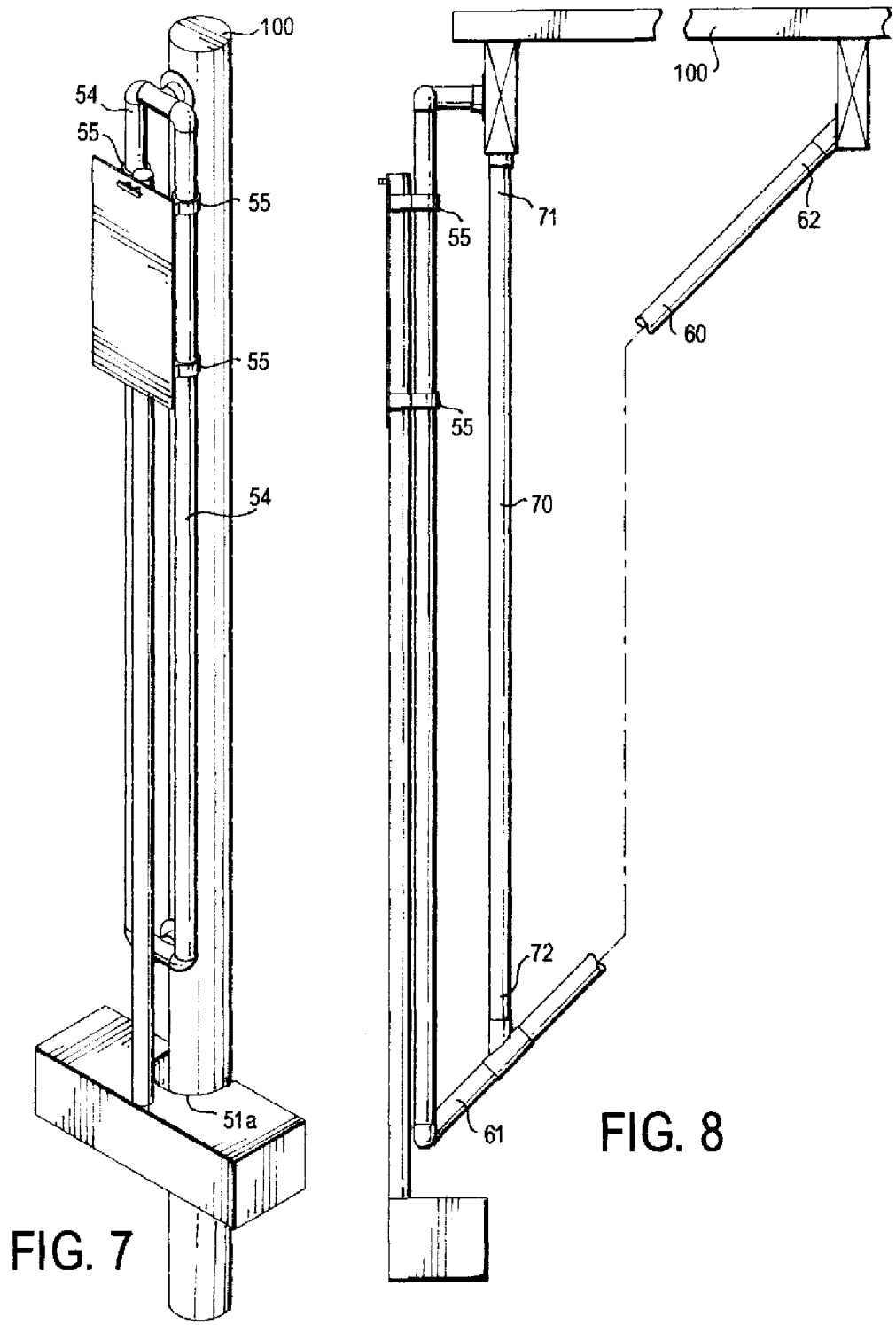

SELF-LEVELING BOAT BUMPER SYSTEM

CROSS-REFERENCE TO RELATED DOCUMENTS

This document is related to, incorporates by reference in its entirety, and claims the priority benefit of U.S. Provisional Patent Application Ser. No. 61/950,477, entitled "Boat Bumper System," and filed on Mar. 10, 2014 by Michael Patrick Moran.

FIELD OF THE INVENTION

The present invention relates to boat bumpers and nautical structures.

BACKGROUND OF THE INVENTION

Boat bumpers are used in conjunction with watercrafts, which can include any type of water-based vessel, such as a boat, ship, personal watercraft, etc. (hereinafter, collectively "boat"). When a boat is attached or fixed to a nautical structure (such as a dock, seawall, another boat, quay wall, etc.), one or more bumpers can be disposed between one or more sides of the boat and the structure to protect such one or more sides and/or the structure from damage arising from the boat contacting the structure by absorbing at least a portion of any kinetic energy arising therebetween. Bumpers have been manufactured from rubbers, elastomers, and plastics.

SUMMARY OF THE INVENTION

The present invention provides a self-leveling boat bumper system that can be attached to a nautical structure at least partially over a body of water having a low tide and a high tide.

In an exemplary aspect, such a system can include a floating bumper arrangement including a float element, a float extension, connected to the float element, and extending upwardly, and a boat bumper connected to said arrangement; and a receiver.

In an exemplary embodiment, a receiver can be fixed to the nautical structure and can be moveably engaged with the arrangement.

In another exemplary embodiment, a receiver can be fixed to the arrangement and can be moveably engaged with a guide fixed to the nautical structure.

In additional exemplary aspects, moveable engagement can be between a low position, in which the boat bumper is at a first position, and a high position, in which the boat bumper is at a second position above the first position; and when floating within a body of water, the float element can provide a buoyancy force that maintains the boat bumper in a static position between, and including, the first and second positions.

In another exemplary aspect, such a system can include one or more of the following optional elements: a bumper adapter connected to the float extension, with the bumper element being attached to the bumper adapter; the float extension can be a ladder; the floating bumper arrangement can include a float deck attached to an upper portion of the float element; a rigid rear brace attached to the system and the nautical structure; and a rigid front brace attached to the nautical structure and a rear brace.

BRIEF DESCRIPTION OF THE DRAWINGS

FIGS. 4a and 4b illustrate exemplary bumper bibs that include a bib body having bib boat and bib bumper sides and a bib aperture.

FIG. 4c illustrates an exemplary bumper bib in an exemplary application, in which a bumper bib can be engaged with a rope-bumper combination.

FIGS. 5c and 5d illustrate another exemplary self-leveling boat bumper system having a float, a float extension, a bumper, an optional bumper plate, and a receiver fixed to piling, with the float extension being movably engaged with the receiver.

FIG. 7 illustrates another exemplary embodiment of a self-leveling boat bumper system having a plurality of guides fixed to a nautical structure, and a plurality of receivers, fixed to an FBA, and moveably engaged with the guides.

FIG. 8 illustrates another exemplary embodiment of a self-leveling boat bumper system optionally including a rear brace and/or a front brace.

DETAILED DESCRIPTION

It is an object of the present invention to provide a self-leveling boat bumper system having a plurality of embodiments, which are described, and are to be broadly interpreted, via the disclosure herein.

It should be noted that this disclosure includes a plurality of embodiments each having a plurality of elements and/or aspects, and such elements and/or aspects need not necessarily be interpreted as being conjunctively required by one or more embodiments of the present invention. In particular, all combinations of elements and/or aspects can enable a separate embodiment of a patentable invention, which may be claimed with particularity in this or any future filed patent applications. Moreover, such elements and/or aspects disclosed herein, whether expressly or implicitly, are to be construed strictly as illustrative and enabling, and not necessarily limiting. Therefore, it is expressly set forth that any elements and/or aspects, independently or in any combination of one of more thereof, are merely illustratively representative of one or more embodiments of the present invention and are not to be construed as necessary in a strict sense.

Further, to the extent the same element and/or aspect is defined differently anywhere within this disclosure, whether expressly or implicitly, the broader definition is to take absolute precedence, with the distinctions encompassed by the narrower definition to be strictly construed as optional.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention.

The present invention provides a self-leveling boat bumper system that can statically position a boat bumper along a vertical range of motion as the level of a body of water changes between low and high tides. Accordingly, such a system can advantageously position a boat bumper in an automated manner as a tide changes.

In an exemplary environment of the present invention, a self-leveling boat bumper system can be attached to a nautical structure that is at least partially over a body of water having a low tide and a high tide. According to the present invention, a nautical structure can include any structure that is at least partially over a body of water, such as, for example and not in limitation, a boat, ship, personal watercraft, any portion of a dock, seawall, boat, quay wall, or any other structure that can be, at least in part, over a body of water.

Figure 5A:
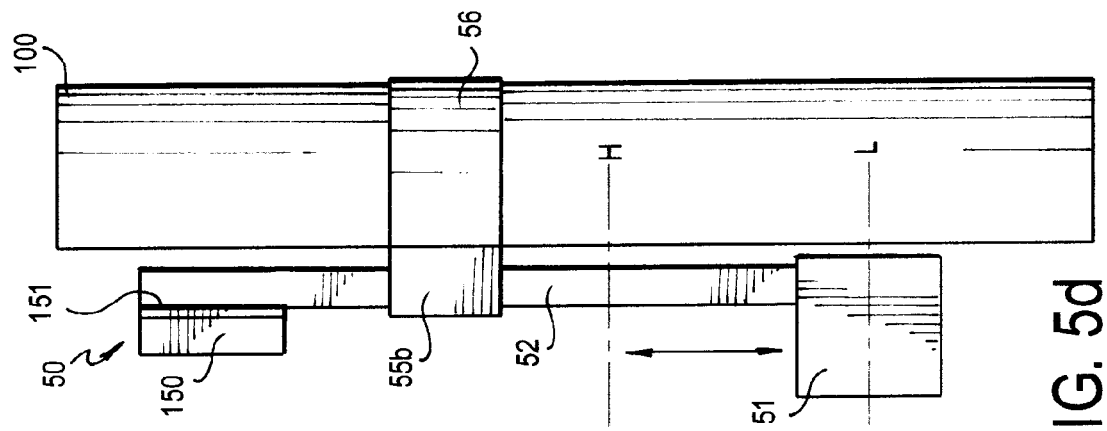
FIGS. 5a and 5b illustrate an exemplary self-leveling boat bumper system having a float, a float extension, a bumper, an optional bumper plate, a guide attached to a piling, and a receiver movably engaged with the guide.
Figure 5B:
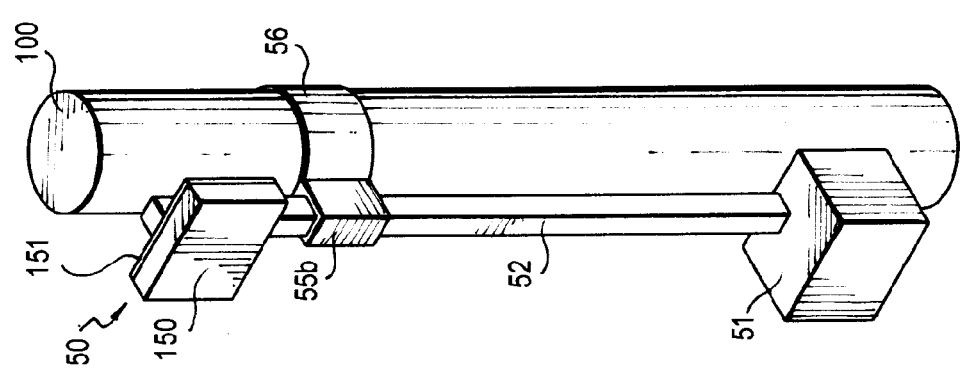

FIGS. 5a and 5b illustrate an exemplary embodiment of the present invention, in which a self-leveling boat bumper system can include an FBA and a receiver, fixed to the FBA, and moveably engaged with a guide fixed to a nautical structure.

Figure 5C:
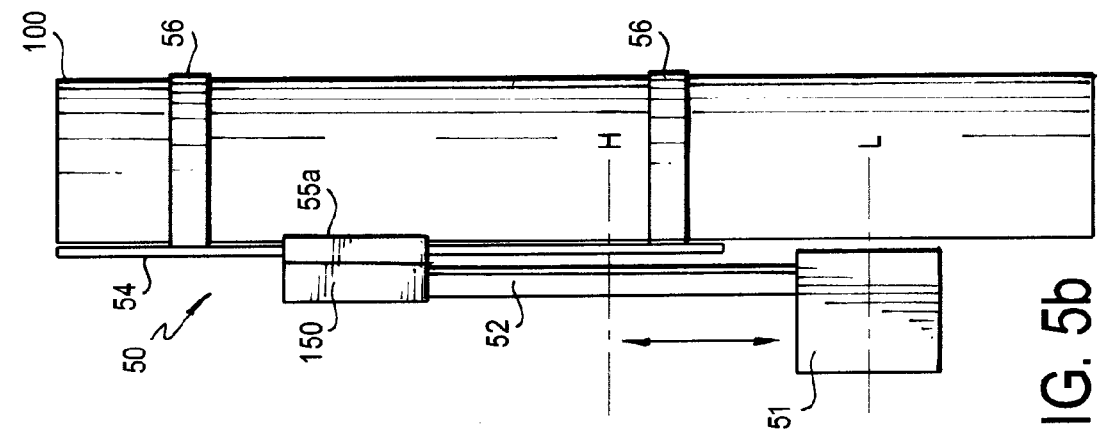
FIGS. 5c and 5d illustrate
Figure 5D:
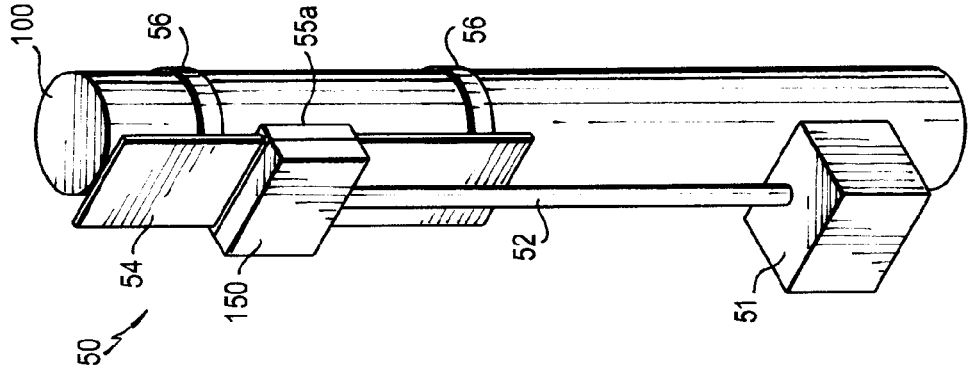

FIGS. 5c and 5d illustrate another exemplary embodiment of the present invention, in which a self-leveling boat bumper system can include an FBA and a receiver, fixed to the nautical structure, and moveably engaged with said arrangement.

As illustrated in FIGS. 5a-5d, an FBA can include a float element 51; a float extension 52, connected to the float element, and extending upwardly therefrom; and a boat bumper 150 connected to any portion of the FBA, which in these examples can be float extension 52. As illustrated in FIGS. 5c and 5d, an FBA can optionally include a bumper adapter 151, which can facilitate the connection of boat bumper 150 to an FBA. Notably, while bumper adapter 151 is illustratively shown as having a rectangular shape, such an adapter can be provided in any functionally compatible shape.

In exemplary aspects of the present invention, a receiver can be provided as any type of structure that surrounds, at least in part, another structure such that moveable engagement between the receiver and other structure is achieved; and further, such a receiver can be fixed to an FBA or a nautical structure. As illustrated in FIGS. 5a and 5b, a receiver 55a can be fixed to any element of the FBA, which in this example can be boat bumper 150; and further, the receiver can be moveably engaged with a guide 54 fixed to a nautical structure 100, which in this example can be a piling 100. And as illustrated in FIGS. 5c and 5d, a receiver 55b can be fixed to a nautical structure 100, and be moveably engaged with any element of the FBA, which in this example can be float extension 52.

As illustratively shown in FIG. 5b, when receiver 55a is engaged with guide 54, the FBA can be positioned with float element 51 in a body of water at a tide level between, and including, a low tide L and a high tide H. In an exemplary aspect of the present invention, float element 51 can be provided, via material selection and/or construction (e.g., material density, at least one hollowed portion, closed-cell foam, etc.), so as to be buoyant, in that it provides a desired buoyancy force that maintains the FBA in a static position. Accordingly, at a particular tide level, boat bumper 150, via connection to float element 51, can be statically positioned relative to the tide level. Further, as the water level changes, moveable engagement of receiver 55a with guide 54 allows the FBA to vertically move along the guide, which can position boat bumper 150 relative to such change.

As illustratively shown in FIG. 5d, when receiver 55b is engaged with float extension 52, the FBA can be positioned with float element 51 in a body of water at a tide level between, and including, a low tide L and a high tide H. And as noted above, float element 51 can be provided, via material selection and/or construction, so as to be buoyant, in that it provides a buoyancy force that maintains the FBA in a static position. Accordingly, at a particular tide level, boat bumper 150, via connection to float element 51, can be statically positioned relative to the tide level. Further, as the water level changes, moveable engagement of receiver 55b with guide 54 allows the FBA to vertically move along the float extension 52, which positions boat bumper 150 relative to such change.

Figure 1A:
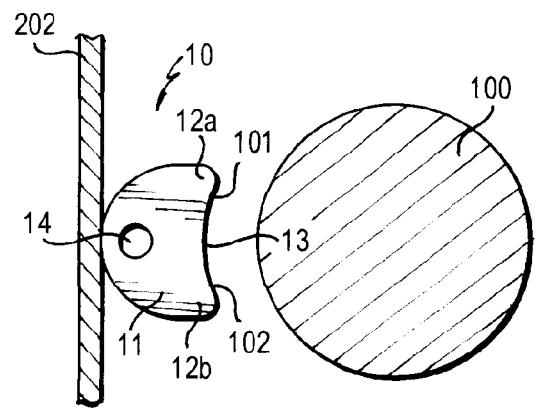
FIGS. 1a and 1b illustrate exemplary improved bumpers that include a main body having a pair of laterally opposed extensions defining a piling pocket for engagement with a piling 100.
Figure 1B:
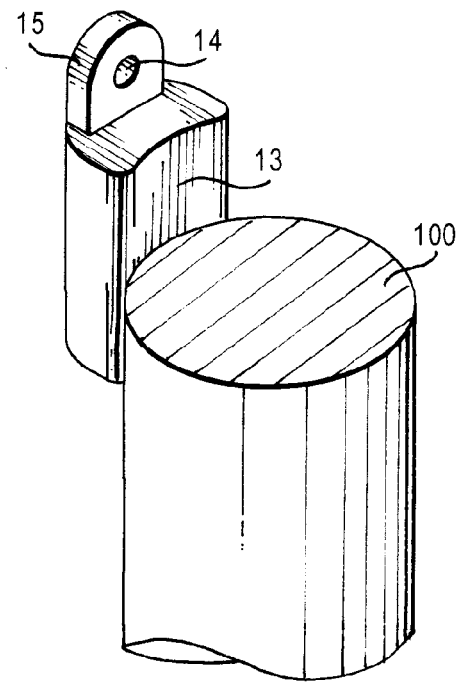
Figure 1C:
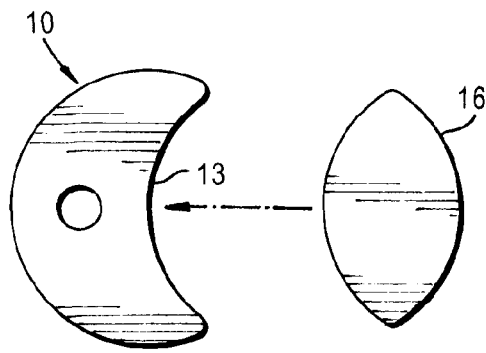
FIGS. 1c and 1d illustrate exemplary improved bumpers having an optional secondary bumper 16, which can be shaped to fit within piling pocket 13 so as to form, in conjunction with the improved bumper, a macro bumper.
Figure 1D:
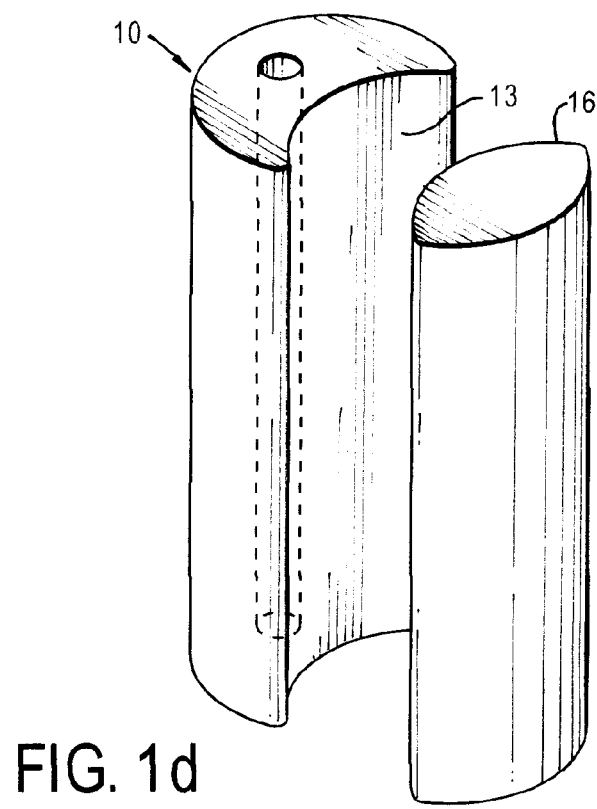
Figure 6:
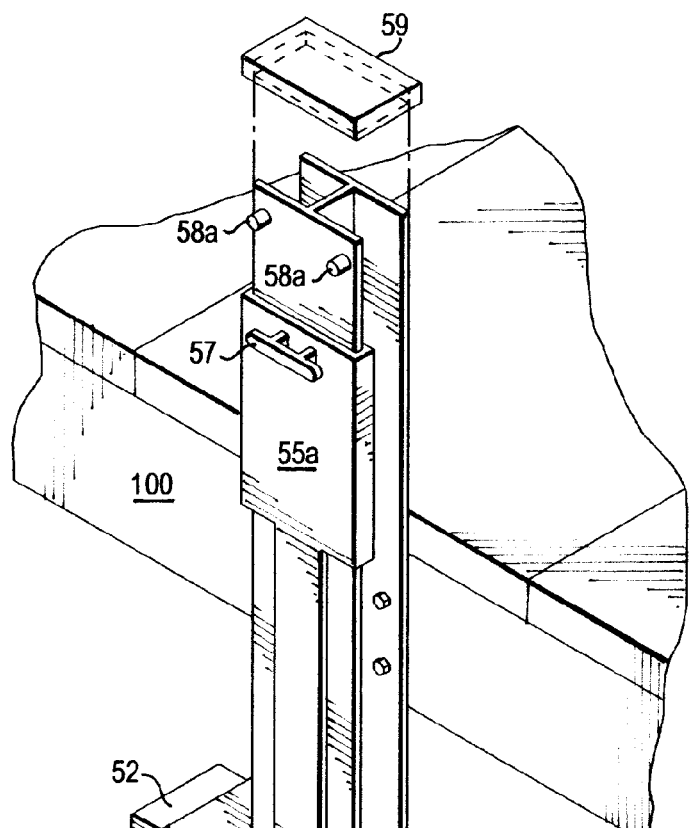
FIG. 6 illustrates another exemplary embodiment of a self-leveling boat bumper system having a floating bumper arrangement ("FBA") and a receiver, fixed to the FBA, and moveably engaged with a guide fixed to a nautical structure.
Figure 1E:
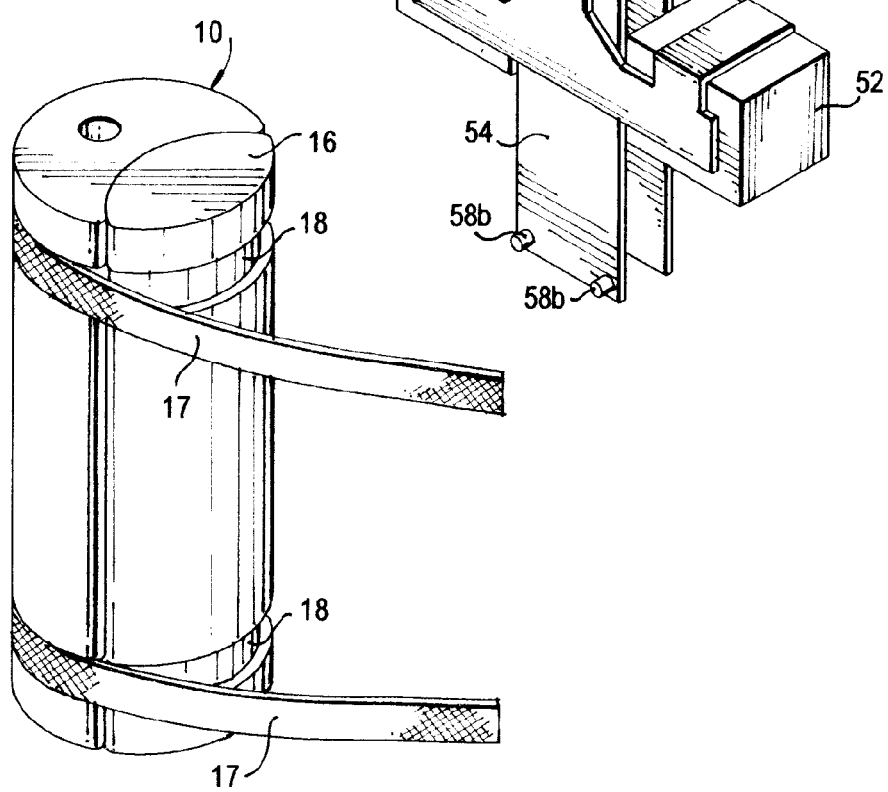
FIG. 1e illustrates an exemplary improved bumper having at least one optional strap groove to assist in positionally maintaining a strap in a desired orientation.
Figure 2:
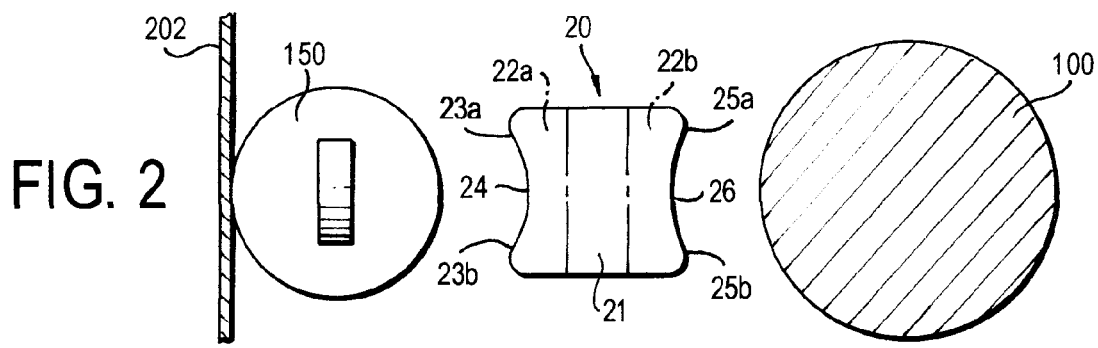
FIG. 2 illustrates an exemplary bumper-to-piling adapter 20 that includes an adapter body having a pair of extensions defining a bumper pocket for engagement with a boat bumper; and a pair of piling extensions defining a piling pocket for engagement with a piling.
Figure 3A:
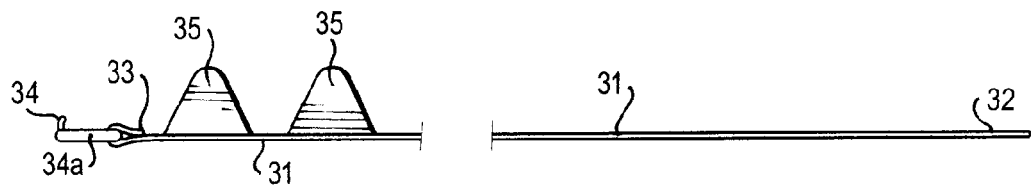
FIG. 3a illustrates an exemplary bumper-to-piling strap that includes a strap portion having first and second ends; a strap lock; and a bumper-piling adapter, which can optionally be attached to any portion of strap 30.
Figure 3B:
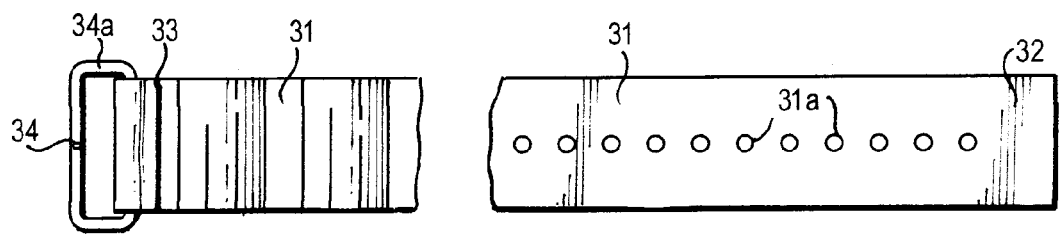
FIG. 3b illustrates an exemplary bumper-to-piling strap having a strap lock provided as a notch for locking engagement with one of at least one strap aperture.
Figure 3C:
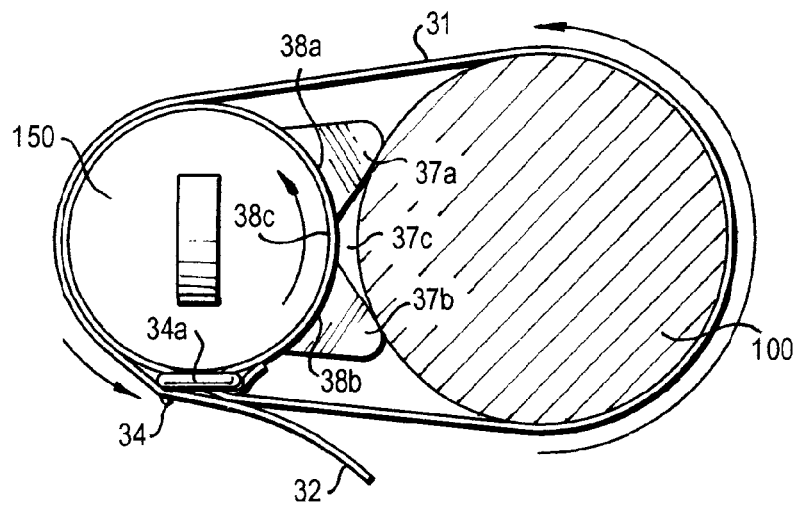
FIG. 3c illustrates an exemplary bumper-to-piling strap engaged in an exemplary manner with an exemplary bumper and piling.

FIG. 6 illustrates another exemplary embodiment of the present invention, in which a self-leveling boat bumper system can include an FBA and a receiver, fixed to the FBA, and moveably engaged with a guide fixed to a nautical structure. As illustrated in FIG. 6, receiver 55a can be moveably engaged with guide 54, which in this example, can be an I-beam fixed to nautical structure 100, which in this example can be a boat dock. As further illustrated, float element 52 can be provided in multiple sections to the extent desired. Notably, as further illustrated in FIG. 6, receiver 55a can optionally include at least one of the following: a boat cleat 57, at least one upper stop 58a to define an upper limit of movement of the receiver, at least one lower stop 58b to define a lower limit of movement of the receiver, and a guide cap 59 to cover the top of guide 54. Also notably, a bumper element (not shown) can be attached to receiver 55a via optional boat cleat 57; however, any other attachment technique can be utilized to the extent desired.

FIG. 7 illustrates another exemplary embodiment of a self-leveling boat bumper system according to the present invention. As illustrated, a plurality of guides 54 can be fixed to nautical structure 100, and a plurality of receivers 55 can be, fixed to the FBA, and moveably engaged with guides 54. Further, float element 51 can optionally be provided with a concave portion 51a to accommodate nautical structure 100, such that the FBA can be operatively positioned closer to the nautical structure.

Referring now to FIG. 8, a self-leveling boat bumper system can optionally include a rear brace 60 and/or a front brace 70, to provide the system with additional structural support. As illustrated, rear brace 60 can include a first rear brace end 61 attached to the system, and a second rear brace end 62 attached to any desired portion of nautical structure 100, which in this example is a boat dock, but can be any other type of nautical structure. As further illustrated, front brace 70 can include a first front brace end 71 attached to any portion of nautical structure 100, and a second front brace end 72 attached to any desired portion of rear brace 60.

Figure 9A:
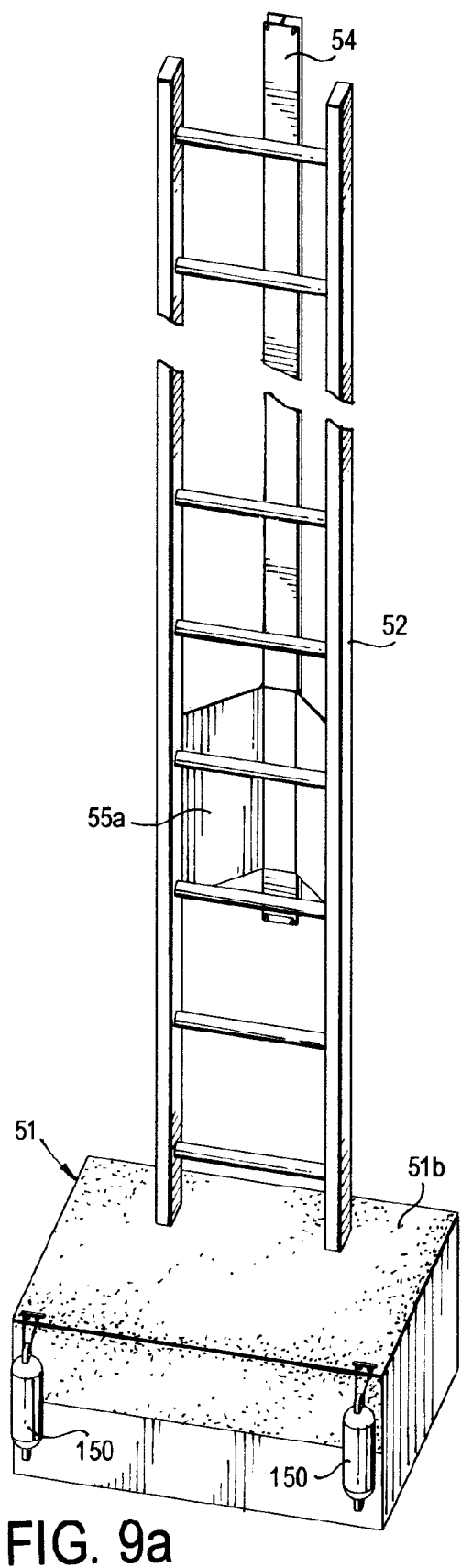
FIGS. 9a and 9b illustrate additional exemplary embodiments of a self-leveling boat bumper system including an FBA having a float element, a float extension, and at least one bumper element attached to the FBA, and a receiver, fixed to the FBA, and moveably engaged with a guide.
Figure 9B:
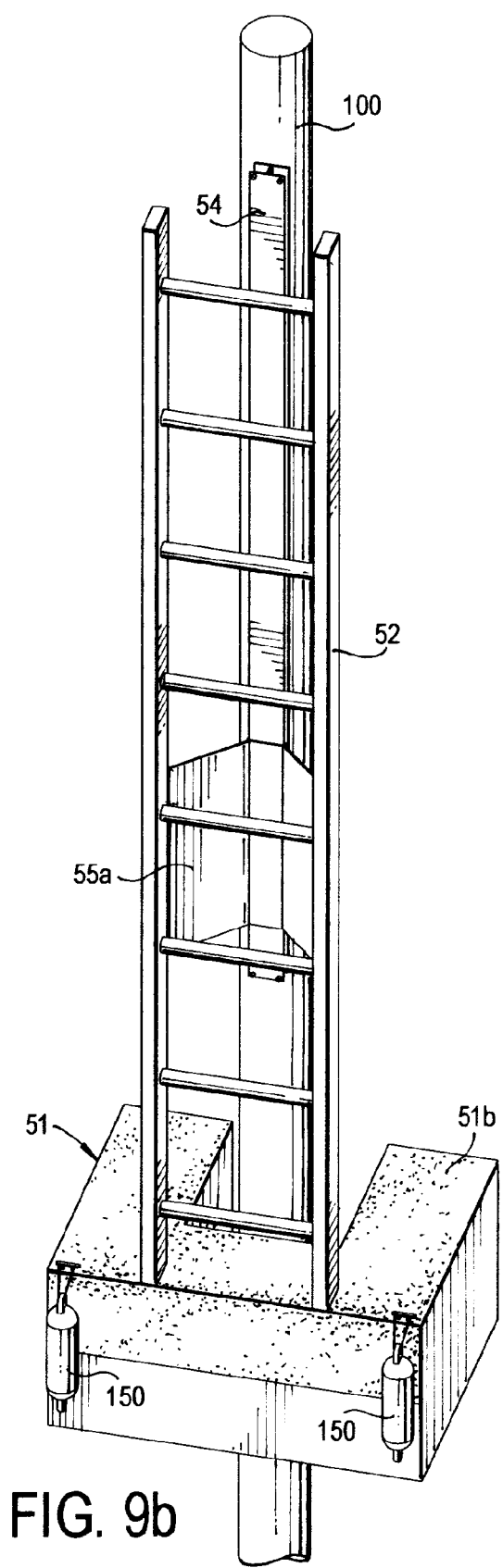

FIGS. 9a and 9b illustrate additional exemplary embodiments of the present invention, in which a self-leveling boat bumper system can include an FBA having a float element 51, a float extension 52, and at least one bumper element 150 attached to the FBA; and a receiver 55a, fixed to the FBA, and moveably engaged with a guide 54 fixed to a nautical structure 100 (not shown in FIG. 9a). These embodiments can be particularly advantageous in environments in which persons seek to move between a boat and a nautical structure, such as a dock. Where there exists a significant height distance between a water level and a deck (walking area) of such a nautical structure, float extension 52 can be provided as a ladder to allow persons to more readily move between the boat and the deck despite the significant height distance.

In an exemplary aspect of the present invention, float element 51 can be provided with sufficient buoyancy to additionally support the additional weight of one or more persons standing on the float element and/or on float extension 52 and/or any other additional element of an FBA. As further illustrated in FIGS. 9a and 9b, an FBA can optionally include a float deck 51b, which can be positioned to cover at least a portion of float element 51.

It should be noted that each element and/or aspect of the embodiments of a self-leveling boat bumper system described herein is expressly set forth as being potentially independently patentable without requiring another. Therefore, the inventor does not waive the right to seek patent protection for all combinations of one or more thereof.

Notably, in any embodiment of the present invention, the various elements can be provided in any desired shape and/or size that are functionally compatible with the present invention as described and/or claimed, and as expressly stated, are not limited to any particular shape or size illustratively described herein or apparent herefrom. Accordingly, exemplary shapes and/or sizes can include any shape or size having one or more geometric shapes, whether having symmetric or asymmetric portions, and without shape or size limitations relative to other elements unless necessary to the functionality of the present invention.

Further, it is expressly set forth that any structural element and/or aspect described herein can be formed from any one or more desired materials that provide functional compatibility with the respective component and/or the respective aspect related thereto. Thus, any one or more of a plastic, rubber, metal, wood, elastomer, crystalline material, man-made material, naturally-occurring material, synthetic, etc. may be utilized insofar as respectively compatible.

Also notably, to the extent any two elements of the present invention are attached, connected, or fixed to each other or to another structure, any one or more known or apparent attachment, connection, or fixation structures can be utilized to effectuate such attachment, connection, or fixation, including but not limited to, an adhesive, a rope, a strap, a clamp, a nail, a screw, a bolt, a nut, a magnet, etc., and are expressly not limited to any particular attachment, connection, or fixation structure illustrative shown or described.

It will be apparent to one of ordinary skill in the art that the manner of making and using the claimed invention has been adequately disclosed in the above-written description of the exemplary embodiments and aspects.

It should be understood, however, that the invention is not necessarily limited to the specific embodiments, aspects, arrangement, and components shown and described above, but may be susceptible to numerous variations within the scope of the invention.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents of the appended claims.

Therefore, I claim:

1. A self-leveling boat bumper system attached to a nautical structure at least partially over a body of water having a low tide and a high tide, comprising:
    a rigid front brace having first and second front brace ends;
    a rigid rear brace having first and second rear brace ends, the first rear brace end being attached to said system;
    a floating bumper arrangement including a float element, a float extension, connected to the float element, and extending upwardly, and a boat bumper connected to said arrangement; and
    a receiver, fixed to one of the nautical structure and said arrangement, and moveably engaged with one of said arrangement and a guide fixed to the nautical structure, the moveable engagement being between a low position, in which the boat bumper is at a first position, and a high position, in which the boat bumper is at a second position above the first position;
    wherein when floating within the body of water, the float element provides a buoyancy force that maintains the boat bumper in a static position between, and including, the first and second positions, said system is attached to the nautical structure at a first attachment point, the second rear brace end is attached to the nautical structure at a second attachment point, the first front brace end is attached to the nautical structure at one of the first attachment point and a third attachment point, and the second front brace end is attached to said rear brace.

2. The system of claim 1, wherein said floating bumper arrangement further includes a bumper adapter connected to the float extension, and the boat bumper is attached to the bumper adapter.

3. The system of claim 1, wherein the float extension is a ladder.

4. The system of claim 1, wherein the float element includes an upper portion and said floating bumper arrangement further includes a float deck attached to the upper portion of the float element.

5. The system of claim 4, wherein the float extension is a ladder.

6. The system of claim 1, wherein the nautical structure is a boat dock.

7. The system of claim 1, wherein said receiver is, fixed to said arrangement, and moveably engaged with the guide.

8. The system of claim 7, wherein said floating bumper arrangement further includes a bumper adapter connected to the float extension, and the boat bumper is attached to the bumper adapter.

9. The system of claim 7, wherein the float extension is a ladder.

10. The system of claim 7, wherein the float element includes an upper portion, and said arrangement further includes a float deck attached to the upper portion.

11. The system of claim 10, wherein the float extension is a ladder.

12. The system of claim 7, wherein the nautical structure is a boat dock.

13. The system of claim 1, wherein said receiver is, fixed to the nautical structure, and moveably engaged with said arrangement.

14. The system of claim 13, wherein said floating bumper arrangement further includes a bumper adapter connected to the float extension, and the boat bumper is attached to the bumper adapter.

15. The system of claim 13, wherein the float extension is a ladder.

16. The system of claim 13, wherein the float element includes an upper portion, and said arrangement further includes a float deck attached to the upper portion.

17. The system of claim 16, wherein the float extension is a ladder.

18. The system of claim 13, wherein the nautical structure is a boat dock.

* * * * *